United States Patent [19]
Gheith

[11] Patent Number: 5,845,118
[45] Date of Patent: Dec. 1, 1998

[54] METHOD FOR GENERATING SHARED LIBRARY EXECUTABLE CODE WITH LAZY GLOBAL OFFSET TABLE ADDRESS CALCULATION

[75] Inventor: Ahmed Mohammed Gheith, Round Rock, Tex.

[73] Assignee: International Business Machines Corporation, Armonk, N.Y.

[21] Appl. No.: 572,471

[22] Filed: Dec. 14, 1995

[51] Int. Cl.⁶ ........................................................ G06F 9/44
[52] U.S. Cl. ........................ 395/685; 395/712; 395/710
[58] Field of Search .................................... 395/685, 710, 395/707, 712, 705

[56] References Cited

U.S. PATENT DOCUMENTS

| | | | |
|---|---|---|---|
| 4,454,579 | 6/1984 | Pilat et al. | 364/200 |
| 4,589,087 | 5/1986 | Auslander et al. | 364/768 |
| 4,787,034 | 11/1988 | Szoke | 364/300 |
| 5,125,092 | 6/1992 | Prener | 395/725 |
| 5,291,601 | 3/1994 | Sands | 395/70 |
| 5,375,241 | 12/1994 | Walsh | 395/700 |

OTHER PUBLICATIONS

R. A. Gingell, M. Lee, S. T. Dang, M. S. Weeks, "Shared Libraries in SunOS", Proceedings of the Summer 1987 Usenix Conference, pp. 131–145, Jun. 8, 1987.

Primary Examiner—Alvin E. Oberley
Assistant Examiner—R. S Rosenholm
Attorney, Agent, or Firm—Mark S. Walker

[57] ABSTRACT

A process for transforming source code into efficient shared library executable code in which global offset table address values are computed only when needed by a function. A condition register and current global offset table address register are added to the code by the compiler. The condition register controls recalculation of the global offset table address. The current global offset table register is saved and the condition register is invalidated by the calling function prior to branching to the new function. The new function calculates the global offset address value only if it is needed. The intermediate code generated by the compiler includes specific routines to process local function calls, function calls by pointer, and external function calls. The system efficiency is improved whenever the actual global offset table access is infrequent compared to function calls across module boundaries. Postponement of global offset table address calculation until the value is needed then frequently avoids the calculation altogether. Condition register setting and current register saving instructions are inserted into otherwise idle cycles in the preferred embodiment.

4 Claims, 3 Drawing Sheets

METHOD FOR GENERATING SHARED LIBRARY EXECUTABLE CODE WITH LAZY GLOBAL OFFSET TABLE ADDRESS CALCULATION

CROSS-REFERENCE TO RELATED APPLICATIONS

The present invention is related to the applications entitled "Method for Eliminating Intra-Module Global Offset Table Address Computation", application Ser. No. 08/572,467 filed on Dec. 14, 1995, and "Method for Efficient External Reference Resolution in Dynamically Linked Shared Code Libraries in Single Address Space Operating Systems", application Ser. No. 08/572,470, filed on Dec. 14, 1995.

BACKGROUND OF THE INVENTION

1. Field of the Invention

The present invention relates to computer implemented technology for compiling a source code program for execution on a computer system and for loading a compiled program for execution. More particularly, the present invention relates to a method for transforming source code into intermediate code so as to eliminate global offset table (GOT) address computation when control is transferred within an object module.

2. Background and Related Art

Computer systems such as the IBM Risc System/6000 are able to execute a large number of programs concurrently. Computer system efficiency is improved by using libraries of shared program code that are shared by all executing programs. Shared libraries eliminate the need to include the library code in each executable program thereby reducing the size of the executable programs. A reduction in executable size reduces the disk storage that must be dedicated to program storage. Shared libraries also improve memory efficiency by allowing a single copy of the library to be present in system memory rather than requiring a copy to be present for each application program that uses it.

Dynamically linked libraries are linked at run time by the application program. Each library makes certain functions and variable values available for use by application programs. These functions and values are called exported functions and exported variables of the library. At application compile time, therefore, the external references to the precise memory location of the exported library variables are not known. The system must provide a mechanism for the application to resolve external references at run-time. Resolution of a reference is the process of determining a memory address for a referenced variable. The memory address allows the program to access that variable data stored at that address.

Shared libraries provide memory position independent pure code, i.e. the code of the library is not modified to account for actual loaded memory location when the library is loaded for execution. The external reference address resolution mechanism must be able to provide an address without requiring load-time modification of the base library code.

Prior art systems have solved this problem in several ways. The AIX operating system creates an exported variable table of contents (TOC) for each shared library. The TOC maps the external references of a library to memory locations. The AIX TOC for a library is adjusted at runtime to reflect the actual memory location of the library functions and variables. The AIX compiler builds the TOC when the library source code is compiled.

All references to an exported variable in AIX require indirect access through the TOC. Indirect access is required even when the exported variable is in the same module as the referencing instruction. This is because the referencing instruction does not know whether the referenced variable is internal or external and therefore must proceed as though it was external to make sure it is correctly accessed. Indirect references are slower than direct references and can impact application performance. In addition, the TOC must always be available to the calling program. A register (typically R2) is dedicated to point to the address of the TOC by convention. The programs must always ensure that the designated register points to the correct TOC, i.e. the TOC for the library function to be accessed. The register must be modified each time a different library is accessed. All function calls in such a system are indirect. The function call first accesses a function description table (FDT) that sets the designated register (e.g. R2) to point to the correct TOC and then accesses the requested function.

The disadvantage of the TOC approach is that most of the code in a program does not require external reference resolution. The TOC architecture, however, requires all references to be through the TOC whether or not they are external to the function. Thus, internal references to the exported variables are slowed by the requirement of indirect reference through the TOC.

The Sun Microsystems Solaris operating system solved the external reference problem in a different way. The Solaris operating system uses a Global Offset Table (GOT) to resolve references. The GOT is created by the compiler at a predetermined location within each library. The location is established so that the program can calculate the location of the GOT at any time thus eliminating the need to provide a register pointing to the GOT table. The GOT is placed by the compiler at the end of the library code. The program can then determine the relative location by determining where the end of the code is relative to the current position.

The relationship between a load module and its GOT is fixed at load time. Each time a program accesses a new load module, it must recalculate the address of the GOT for that module. Systems such as the IBM PowerPC microprocessor do not have a mechanism to detect module boundary crossings by a function call. Thus, each function call must recalculate the GOT address since it does not know whether the call crosses a load module boundary or not.

A shared library has the advantage that only one copy of the library code needs to be present in the computer system memory even though several programs are using that code. Multiple client programs can access the library through function calls. Each client instance maintains a separate set of variable data but but executes the same set of code. Multiple use of a single set of library code increases memory efficiency. It is important, however, that the sharing of code not introduce additional overhead that eliminates the performance advantage of shared library code.

A technical problem exists of providing shared library code that efficiently accesses exported functions. In particular, a problem exists of providing shared library code that can directly access exported functions within the same load module without the added overhead of GOT address recalculation or loading of a TOC register.

SUMMARY OF THE INVENTION

The present invention is directed to a method for compiling and loading a source code program for execution such that intra-module function calls do not recalculate the GOT address on a computer processor with reserved condition register fields. The present invention provides a process in which GOT address recalculation is performed only where the function call crosses a module boundary. The postponement of GOT address recalculation speeds the execution of the program and reduces system overhead for shared libraries.

The present invention relates to a method for optimizing executable code performance during source code compilation, the source code including one or more functions callable by other functions and the compiled set of functions comprising an executable module, the method comprising the steps of: exporting callable functions of the source code by generating a relocatable function to address mapping at a memory location; testing each source code statement to determine whether or not it requires the function to address mapping; and determining the memory location only if the function requires function to address mapping and a function map pointer is invalid.

It is therefore an object of the present invention to provide a method for compiling a source program that avoids exported function address transformation unless a call is external to the current module.

It is yet another object of the invention to provide a system for reducing shared library overhead by directly referencing exported functions directly in a shared library when referenced by a function in the same library module.

It is still another object of the invention to provide a method for eliminating GOT address calculation during a function call unless the function call crosses a load module boundary.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 2:
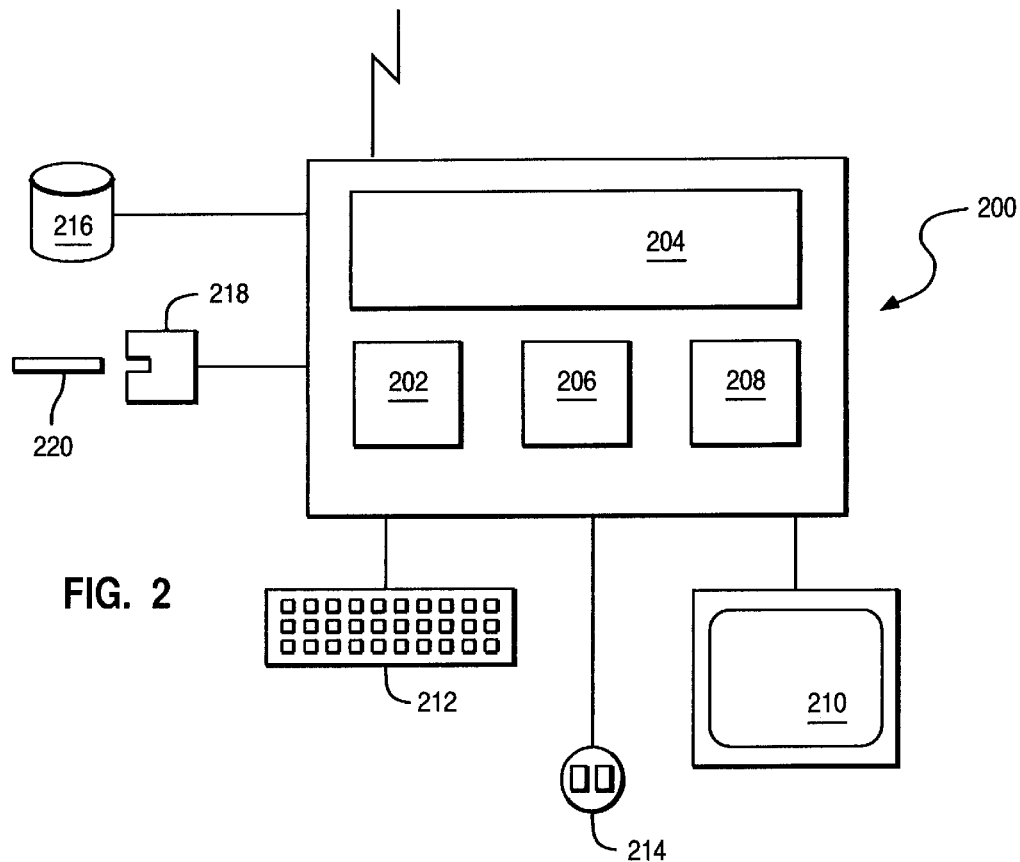
FIG. 2 is a block diagram of a computer system in which the preferred embodiment of the present invention is practiced.

The preferred embodiment of the present invention is practiced in a computer system such as that shown in FIG. 2. The computer system can be any of a number of commercially available systems such as the IBM RISC System/6000 workstation or the IBM Personal Computer workstation. The preferred embodiment requires a system 200 with a processor 202, random access memory 204, input/output controller 206 and network controller 208 for managing the communications with network resources. Processor 202 can be any of a variety of single or multiple processor packages such as the IBM PowerPC microprocessor. Input/Output controller 206 manages input/output resources including, but not limited to, a display monitor 210, a keyboard 212, a pointing device 214, permanent storage 216, and removable storage media 218, 220. Permanent and removable storage media can be any known type including magnetic disk, optical disk or magnetic/optical disks.

The preferred embodiment of the present invention is implemented on a system using a PowerPC microprocessor. This microprocessor provides reserved condition register fields that can be set to indicate a condition. The present invention uses a condition register field to indicate that the global offset table address register is invalid.

Figure 3:
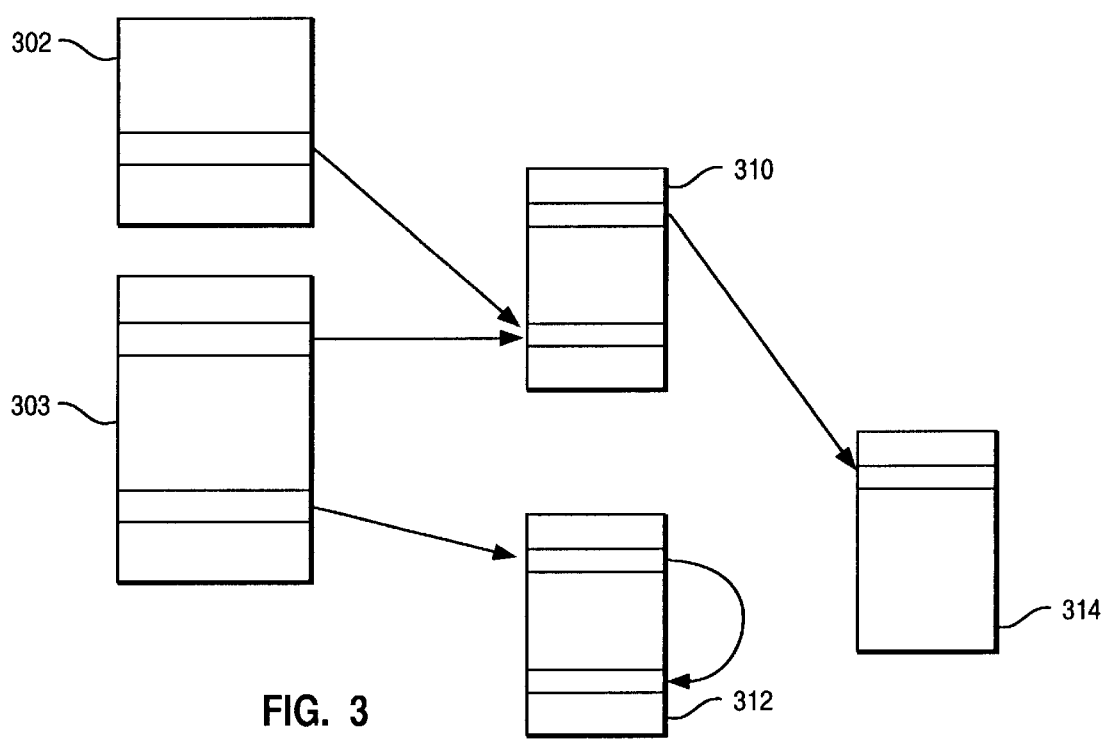
FIG. 3 is a block diagram illustrating the address references in a system according to the present invention.

Shared libraries are used by client processes as shown in FIG. 3. Client programs 302, 303 use functions in shared libraries 310, 312, 314. Although two client processes and three shared libraries are shown, it will be recognized that any number of client programs or shared libraries may be involved without departing from the spirit of the invention. A shared library is typically loaded into the system when it is first invoked by a client process. The present invention is part of the process of setting up the client process to access the shared library whether the shared library is being loaded for the first or later time.

Figure 4:
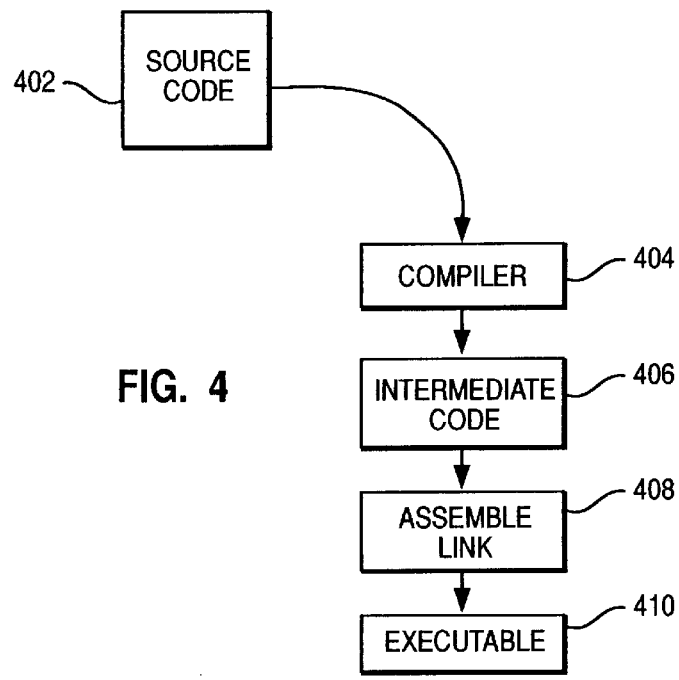
FIG. 4 is a block diagram illustrating the steps of compilation according to the present invention.
Figure 5:
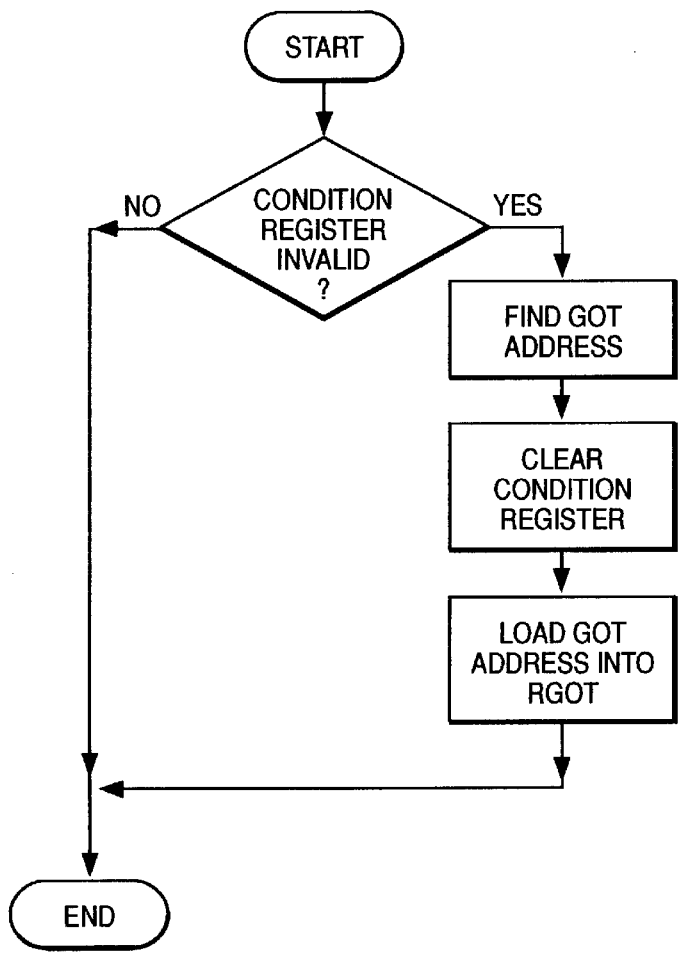
FIG. 5 is a flowchart illustrating the process of recalculating the global offset table address according to the preferred embodiment of the present invention.

The process of the present invention is implemented within a compiler program for compiling program source code into executable code. A compiler typically operates as shown in FIG. 4. Source code 402 is read by compiler 404 and transformed into a set of basic operations known to the computer system. These basic operations are typically expressed as assembly language code 406. The assembly language code 406 is assembled and linked with required object modules to form the final executable 410. The loader loads a program for execution in the computer. The loader loads the program at a specific address in memory and modifies address references within the program based on the loaded location in memory. The GOT table is modified by the loader to correctly resolve shared library external references and is used by the library functions and client processes to resolve references within the library.

The preferred embodiment of the present invention is implemented in a compiler for transforming source code into object code. The compiler analyzes the source code statements and generates intermediate code. The present invention uses a register (e.g. RGOT) to hold the current GOT address and a condition register (e.g. CRGV) that indicates whether or not the current value in RGOT is valid. The condition register allows the recalculation of the GOT address to be postponed until it is needed. If the function does not actually access the GOT, then the GOT address is not recalculated. Since the GOT is typically accessed infrequently, this postponement improves overall system efficiency.

Figure 1:
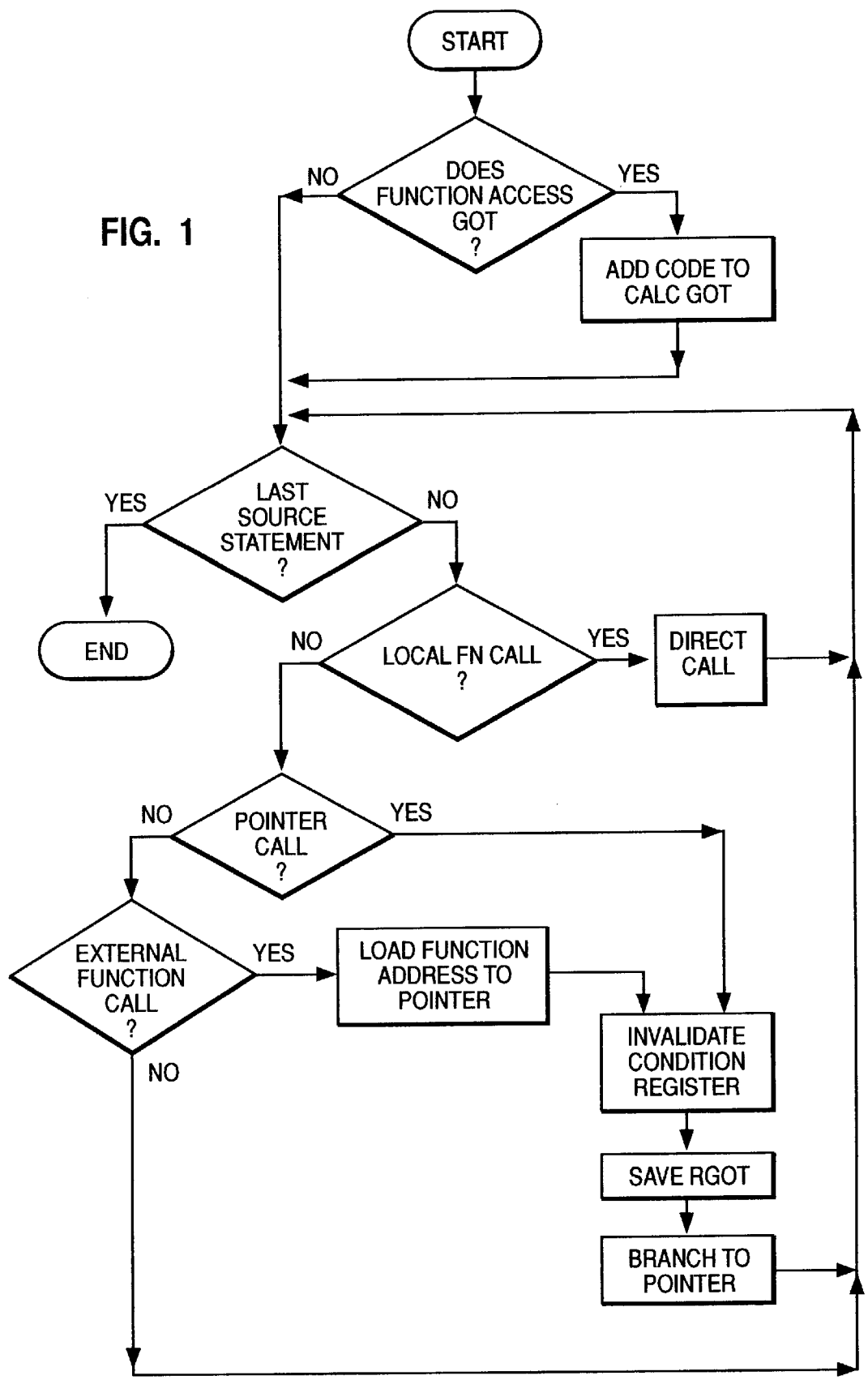
FIG. 1 is a flowchart depicting the process of the preferred embodiment of the present invention.

The preferred embodiment of the present invention is described using the flowchart in FIG. 1. The function being compiled is first examined to determine whether or not it requires access to the Global Offset Table (GOT.) If so, an instruction is added to the function to calculate the GOT address if the condition register is invalid. This can take the form of a conditional branch, as follows:

```
...
bcl      4,CRGV,find_got      #branch of CRGV is invalid
...
```

The branch to calculate the GOT address is taken whenever the CRGV register is invalid. Thus, if the RGOT value remains valid and the CRGV register is not invalided, the calculation is avoided.

The routine used by the preferred embodiment to calculate the GOT value is as follows:

```
find_got:
    lis     RGOT,GOT@ha         #fixed by loader
    crxor   CRGV, CRGV, CRGV    # clear the bit
    ai      RGOT,RGOT,GOT@l     # fixed by loader
    br
```

The location of the GOT would be determined by the loader when the module is loaded for execution. The loader would fix the references in the find_got function so they point to the actual GOT address. Those skilled in the art will recognize that other routines could be used to accomplish the same results without departing from the spirit of the invention.

The compiler must next transform the function calls within the module being compiled to ensure that the CRGV register is invalidated when a function call crosses a module boundary and to store the current RGOT value for use on return from a function call. Three types of function calls must be considered: local calls within a module; calls based on a pointer that may or may not cross a module boundary; and external function calls.

Local function calls are within a module and should not need to recompute the RGOT if it was already valid. A local call to function "foo" is implemented as follows:

```
    ...
    Bl      foo
    cror    31,31,31            #no-op
    ...
```

Pointer calls may or may not cross a module boundary. The instructions must provide for the case in which a module boundary is crossed, thus the condition register CRGV must be invalidated and the current RGOT value stored before branching to the address in the pointer. The code to accomplish this is as follows:

```
    l       r11, pointer        #get the function pointer in R11
    bl      ptrgl               # ptrgl will save RGOT and call
                                the function
    l       RGOT, GOT_OFF(SP)   # restore RGOT from stack
```

The pointer call logic is implemented as follows:

```
ptrgl:
    mtctr   r11                 # you can squeeze 3 IU
                                instructions between this and
                                the bctr
    st      RGOT,GOT_OFF(SP)
    creqv   CRGV,CRVG,CRGV      # set the invalid bit
    bctr                        # branch to the pointer address
```

The st RGOT and creqv instructions are placed to fit in what would have been pipeline stall cycles between mtctr and bctr. This makes storing the current RGOT and invalidating CRGV "free" operations. The mtctr moves an address to a counter field and bctr branches to that counter address. Other microprocessors may implement different instructions for branching to an address and may not have a pipeline stall to fill. The present invention is applicable to other microprocessor architectures and requires only that storing the existing RGOT value and invalidating the CRGV condition register field occur before the branch.

External function calls are implemented by using a local glue function. This glue function transforms the external function call into a pointer call and then uses the pointer logic described above. The code for this would be as follows:

```
    ...
    Bl          foo.glue
    ...
foo.glue:
    l           r11,FOO_OFFSET(RGOT)    *load the pointer
                                        based on the function
                                        offset in RGOT
    b           ptrgl                   # branch to pointer
                                        call logic
```

The process of the present invention, as described above, operates in a compiler for transforming source code to object code. The source program is not changed. The loader must only modify the addresses in the find_got function to account for the actual loaded location of the GOT. The remaining code is position independent pure code.

The present invention has the advantage of avoiding the need for function descriptors as used by the AIX operating system TOC. The function pointers of the present invention are globally valid and thus can be readily shared. Although the find_got routine is more expensive in terms of instruction path length than prior art methods of GOT computation, it is used much less frequently resulting in an overall efficiency improvement. The use of idle cycles to set the CRGV register and store the current RGOT further improve the efficiency of this process.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A method for improving executable code runtime performance during source code compilation, the source code including a plurality of statements of which some, all or none of said statements access executable functions that reside external to the said source code module, each executable function having a function name and a function entry point, in executable modules external to said source code, the method comprising the steps of:

for each associated source code module, generating a relocatable function name to function entry point memory address map stored at a memory location relative to the address of a compiled object module associated with said source code module, to resolve access to external functions accessed from inside the associated module;

for each source code statement in said source code module testing each source code statement to determine whether execution of said statement requires said function entry point memory address map;

for each source code module, if at least one statement said module requires said function entry point memory address map, inserting a local function to determine an absolute address for said address map memory location and storing said absolute address in a function entry memory address map pointer;

for each function call in said source code module, determining whether the function called is local to the source code module, and replacing each function call that is not local to the module with a function pointer that first saves the function entry point memory address map pointer, marks the function entry point memory address map pointer as invalid and then branches to an entry point address; and inserting executable code to invoke said inserted local function to determine the absolute address said function entry point memory address map pointer is invalid.

2. A method of compiling a plurality of source code functions into an executable module, where program code is inserted to delay runtime global offset table address computation in a function until the global offset table address is required to resolve a reference to an executable function that resides external to the source module, the compiling performed in a computer system having a processor and memory, the method comprising:

for each source code function, transforming each source code statement of the source code function into intermediate compilation code having one or more intermediate instructions by repeating the following steps for each source code statement in the source code function:

testing the source code statement to determine whether it accesses an executable function that resides external to the source code module thereby requiring reference to a global offset table;

if a source code statement accesses an executable function, inserting into said intermediate compilation code an intermediate instruction causing conditional computation of global offset table address;

for each source code function, if at least one statement accesses an executable function that resides external to said source code module, inserting into said intermediate complication code a plurality of intermediate instructions to perform the computation of the global offset table address;

for each source code function statement:

testing each source code function statement to determine whether it is a local function call;

if said source code function statement is a local function call, inserting intermediate instructions causing a branch to said local function;

testing each source code function statement to determine whether it is an external function call or a pointer function call;

if said source code function statement is a function pointer call, inserting into said intermediate compliation code intermediate instructions causing a current global offset address to be saved and a global offset table address condition set to invalid, and inserting intermediate instructions to branch to the function addressed by the function pointer;

if said source function statement is an external function call, replacing the external function name with a calculated pointer to the external function and performing the steps for a pointer function call;

generating intermediate instructions into said intermediate compliation code for said source code statement if it is not a local, pointer or external function call.

3. The method of claim 2, wherein the instructions for saving the current global offset table address and invalidating the condition are inserted in said intermediate compliation code before a branch instruction so that they execute during instruction cycles that would normally be lost to an instruction pipeline stall.

4. A computer program product having a computer readable medium having computer program logic recorded thereon for improving executable code runtime performance during source code compliation, the source code including a plurality of statements, of which some, all or none access executable functions that reside external to the source code module, each executable function having a function name and a function entry point, said computer program product comprising:

computer program product means for causing a computer system to generate for each source code module a relocatable function name to function entry point memory address map stored at a memory location relative to the address of the compiled object code module associated with said source code module, for external functions accessed from inside the associated module;

computer program product means for causing a computer system to test each source code statement to determine whether execution of said statement requires said function entry point memory address map;

computer program product means for causing a computer system to insert, for each source code module a local function to determine an absolute address for said address map memory location and storing said absolute address in a function entry point memory address map pointer, if at least one statement in said source code module requires said function entry point memory address map;

computer program product means for causing system to test each function call in said source code to determine whether the function called is local to the module and to replace each function call that is not local to the module with a function pointer that first saves the function entry point memory address map pointer, marks the function map pointer as invalid and then branches to an entry point address;

computer program product means for causing a computer system to insert executable code to invoke said inserted local function to determine an absolute address if said function entry point memory address map pointer is invalid.

* * * * *

UNITED STATES PATENT AND TRADEMARK OFFICE
CERTIFICATE OF CORRECTION

PATENT NO. : 5,845,118
DATED : Dec. 1, 1998
INVENTOR(S) : Gheith

It is certified that error appears in the above-identified patent and that said Letters Patent is hereby corrected as shown below:

Column 7, line 10 after "address" insert --if--;

Signed and Sealed this

Twenty-eighth Day of September, 1999

Attest:

Q. TODD DICKINSON

Attesting Officer

Acting Commissioner of Patents and Trademarks